United States Patent
Everett et al.

(10) Patent No.: US 7,411,194 B1
(45) Date of Patent: Aug. 12, 2008

(54) AVIATION VISION APPARATUS

(75) Inventors: Jonathan Everett, Arlington, MA (US); John A. Gagnon, Manchester, NH (US); Athanasios Pashos, Hooksett, NH (US); Roberto Rodriguez, Manchester, NH (US); Richard Wolfe, Londonderry, NH (US)

(73) Assignee: Kollsman, Inc., Merrimack, NH (US)

( * ) Notice: Subject to any disclaimer, the term of this patent is extended or adjusted under 35 U.S.C. 154(b) by 0 days.

(21) Appl. No.: 11/594,028

(22) Filed: Nov. 8, 2006

Related U.S. Application Data (60) Provisional application No. 60/734,816, filed on Nov. 9, 2005.

(51) Int. Cl.
*H01L 31/00* (2006.01)
(52) U.S. Cl. ..................................................... 250/332
(58) Field of Classification Search .................. 250/332; 359/630; 345/8
See application file for complete search history.

(56) References Cited

U.S. PATENT DOCUMENTS 5,763,882 A * 6/1998 Klapper et al. ............... 250/332
6,023,061 A * 2/2000 Bodkin ........................ 250/332

* cited by examiner

*Primary Examiner*—David P. Porta
*Assistant Examiner*—Mark R Gaworecki
(74) *Attorney, Agent, or Firm*—William B. Ritchie (57) ABSTRACT

An aviation vision apparatus. Its purpose assists a pilot's ability to fly an aircraft by providing increased visibility. The apparatus features an uncooled IR sensor for vision enhancement. An integrated window assembly is provided which permits the sensor to obtain its imagery. The apparatus also has an integrated aerodynamic enclosure. The apparatus features electronics responsible for window assembly window control functions and IR sensor control. The apparatus is a single line replaceable unit that receives control commands from the aircraft's head-down display or other control modules. The unit also provides for the video display.

10 Claims, 8 Drawing Sheets

Standard Imaging     Fig. 10

Imaging during Non uniformity correction

Fig. 11

AVIATION VISION APPARATUS

This application claims benefit of U.S. Provisional Application Ser. No. 60/734,816 filed Nov. 9, 2005, pursuant to 35 USC §119(e).

FIELD OF THE INVENTION

This invention relates to vision systems for aircraft, in particular, an apparatus to help enhance a general aviation pilot's ability to fly by increasing visibility.

BACKGROUND OF THE INVENTION

It is well known that assisting an aircraft pilot with maneuvers in situations of low or no visibility is desirable and numerous solutions have been provided to accomplish that task. Typically, modern aircraft can be equipped with Forward Looking Infrared Cameras (FLIR). These cameras are part of the Enhanced Vision System (EVS), which is used to improve the capability for commercial, business and military aircraft to execute precision approaches and land safely in fog, rain, snow and other reduced visibility conditions thereby reducing accidents. The EVS also provides improved awareness during ground operation aiding in the reduction of runway incursion accidents.

The FLIR optics is typically mounted behind a separate radome which serves to protect the FLIR. The optics exterior surface can drop below dew point during operation, impeding image quality due to condensation and frost. It is the nature of this invention to solve this problem in a manner that is efficient, durable and cost-effective. However, each radome and its contained electronics must be superficially designed for the particular aircraft. Further, the high cost of such systems makes them impractical for use with general aviation aircraft.

A light, single line replaceable apparatus that utilizes an uncooled microbolometer incorporating a non-uniformity correction scheme and wherein the apparatus is independently sealed from the aircraft interface is not found in the art.

SUMMARY OF THE INVENTION

An aviation vision apparatus that helps enhance a pilot's ability to fly an aircraft by providing increased visibility. The invention features an un-cooled IR sensor for vision enhancement. An integrated window assembly is provided which permits the sensor to obtain its imagery. The apparatus also has an integrated fairing enclosure for aerodynamics. The apparatus also has electronics responsible for window assembly heater control functions and IR sensor control. The apparatus is a single line replaceable unit that receives control commands from the aircraft head-down display or other control module and provides video for display.

It is an aspect of the invention to provide an aviation vision apparatus that uses a focal plane array based on microbolometers that are well known in the art.

Another aspect of the invention is to provide an aviation vision apparatus that uses a non-uniformity correction ability that enables the pilot to adjust the vision scene.

Another aspect of the invention is to provide an aviation vision apparatus that incorporates a window that is heated by conduction from its perimeter.

Still another aspect of the invention is to provide an apparatus that can be mounted on the top or on the bottom of an aircraft.

It is an aspect of the invention to provide a mounting method that requires only mounting plate changes for each unique installation requirement.

Another aspect of the invention is to provide a mounting plate that enables system boresighting capabilities as well as mounting the unit to the aircraft.

Still another aspect of the invention is to provide a mounting plate that can be boresighted using shims.

Another aspect of the invention is to provide an aviation vision apparatus that is light weight, weighing less than five pounds overall.

Still another aspect of the invention is to provide an aviation vision apparatus that is completely enclosed in aerodynamic fairing that permits installation like an antenna on the aircraft.

These and other aspects of the invention will become apparent in light of the detailed description of the invention which follows.

DESCRIPTION OF THE PREFERRED EMBODIMENTS

Figure 1:
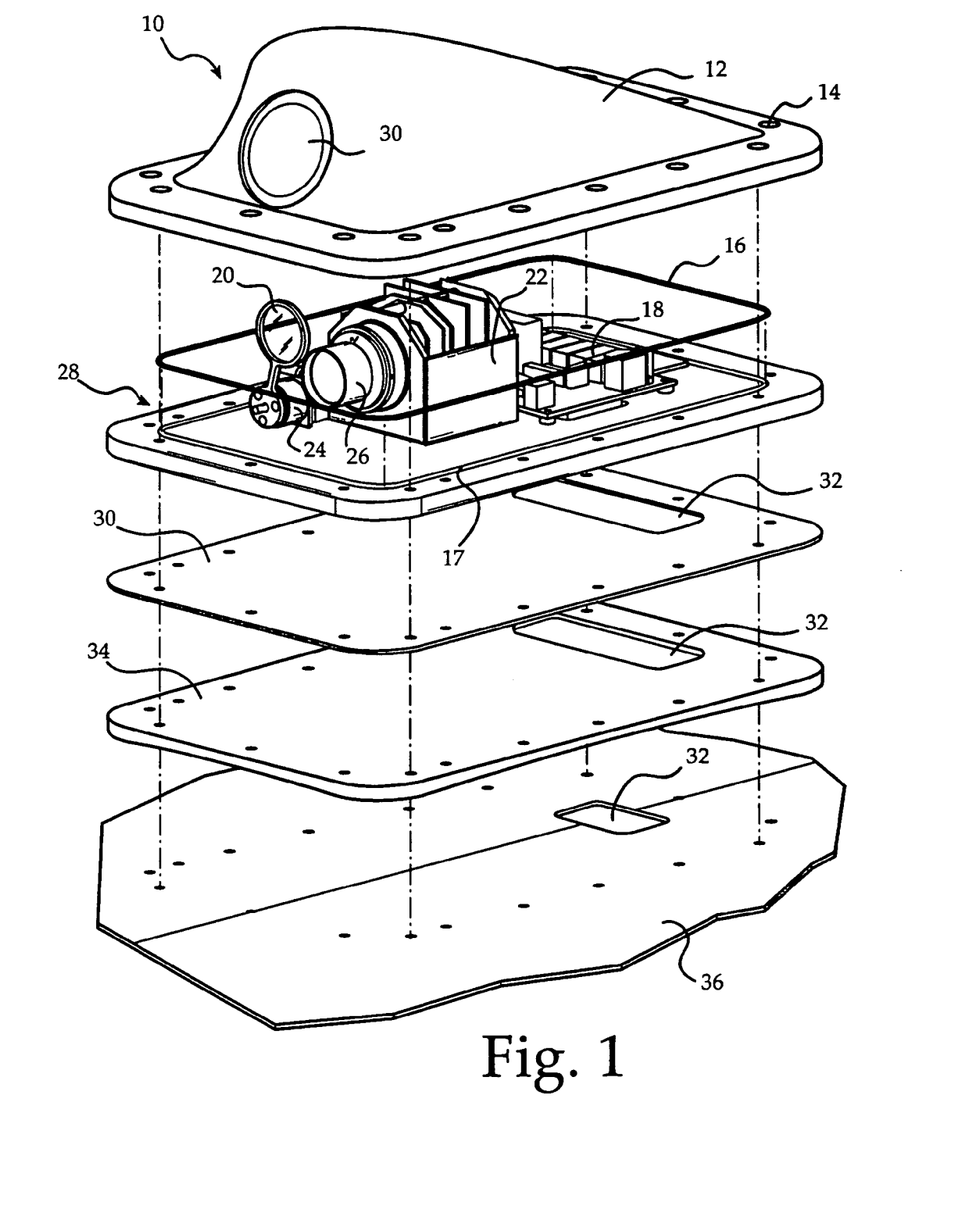
FIG. 1 is an isometric explode view of the invention showing the major components.
Figure 2:
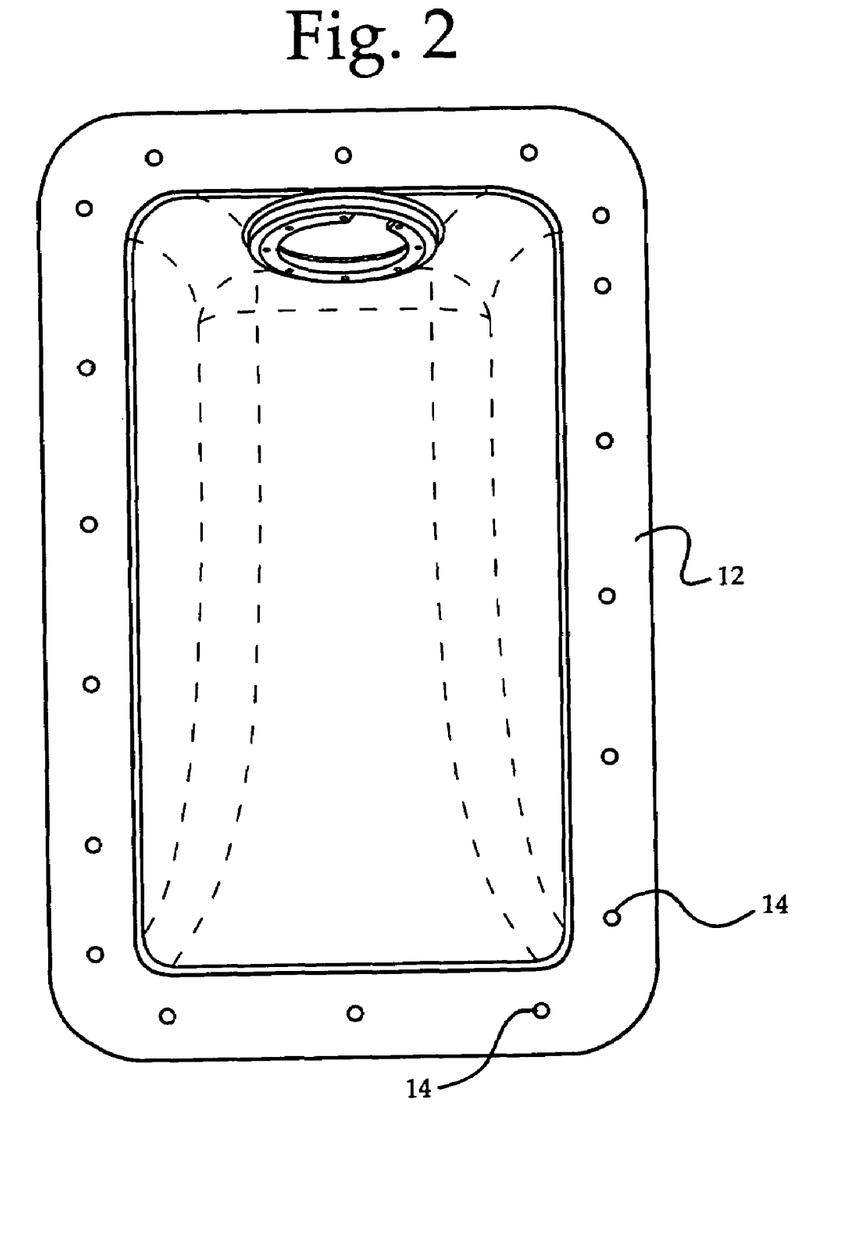
FIG. 2 is an inside view of the cover showing the window removed.
Figure 3:
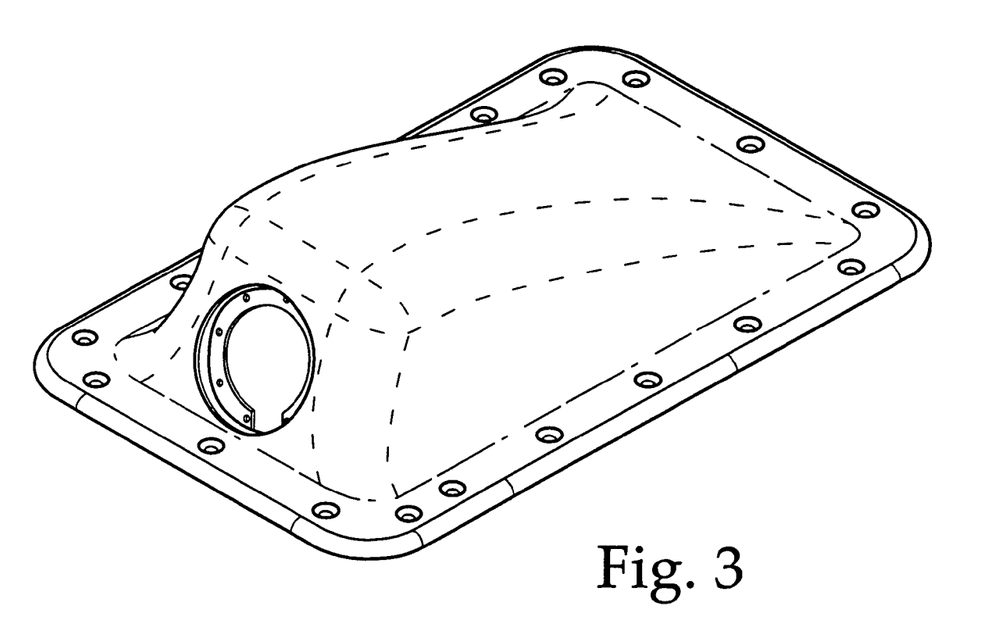
FIG. 3 is a top view of the cover with the window removed.
Figure 4:
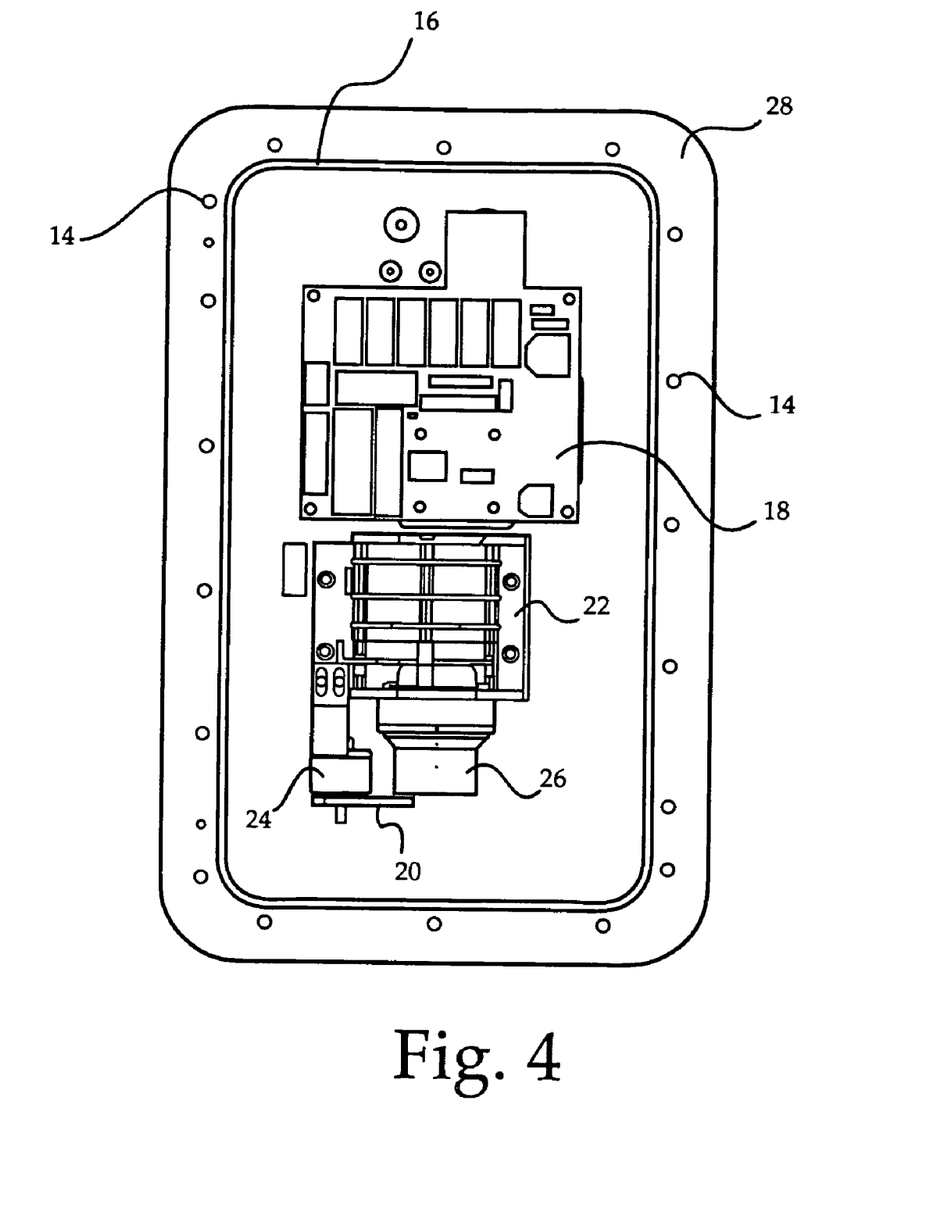
FIG. 4 is a top view of the invention with the cover removed.
Figure 5:
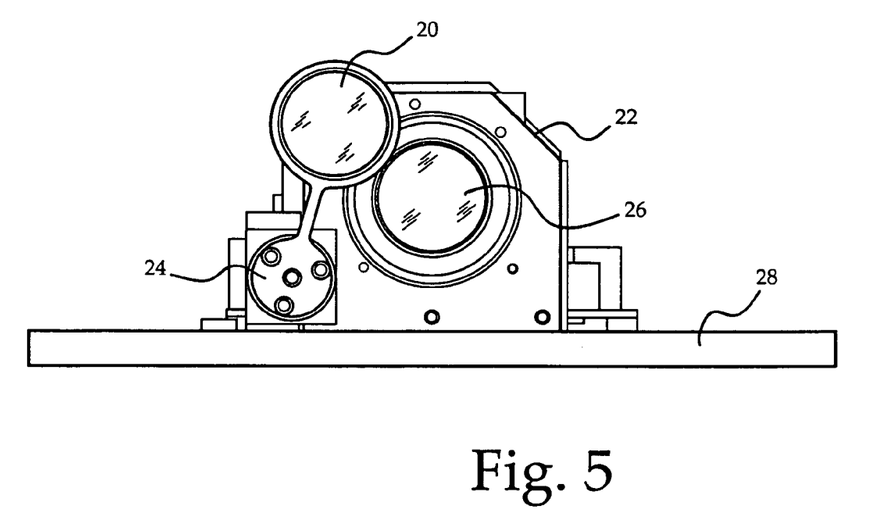
FIG. 5 is a front view of the microbolometer with a non-uniformity correction lens moved away from the lens of the microbolometer.
Figure 6:
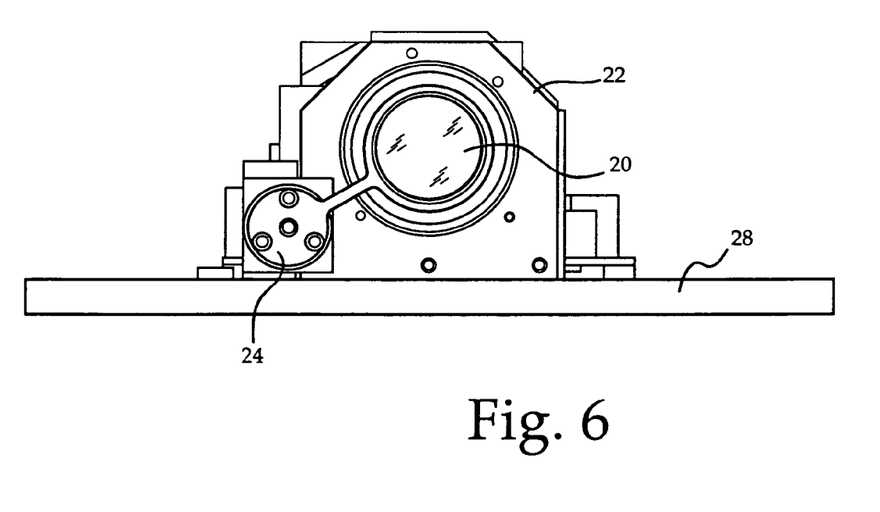
FIG. 6 is a front view of the microbolometer with a non-uniformity correction lens moved in front of the lens of the microbolometer.
Figure 7:
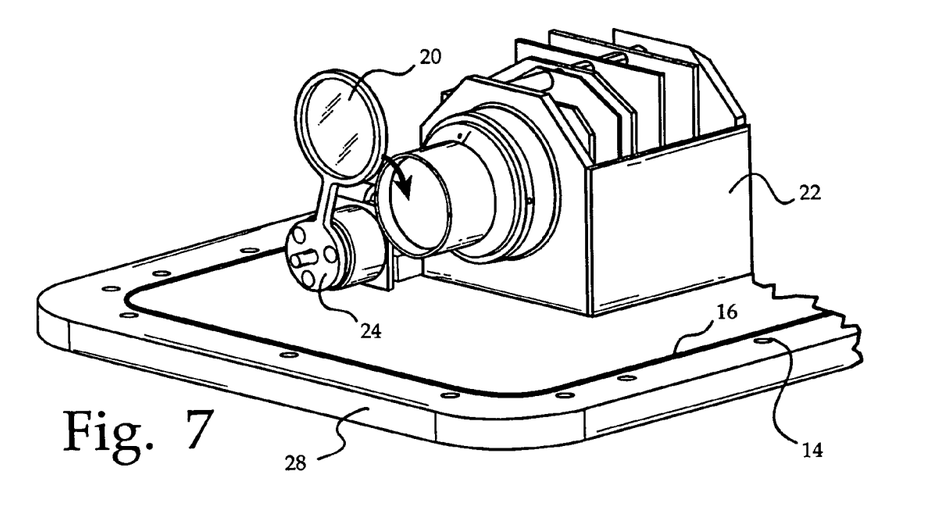
FIG. 7 is an isometric view showing the rotation of the non-uniformity flag over the lens of the microbolometer.
Figure 8:
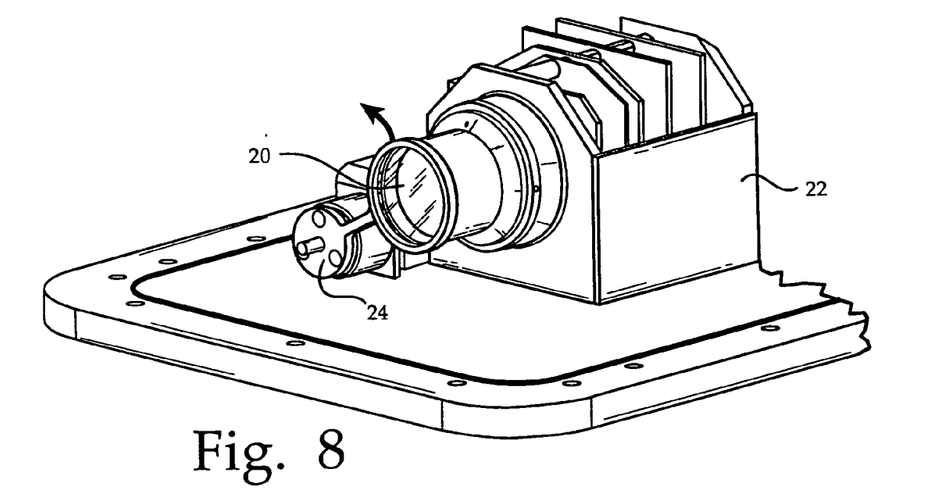
FIG. 8 is an isometric view showing the rotation of the non-uniformity flag away from the lens of the microbolometer.
Figure 9:
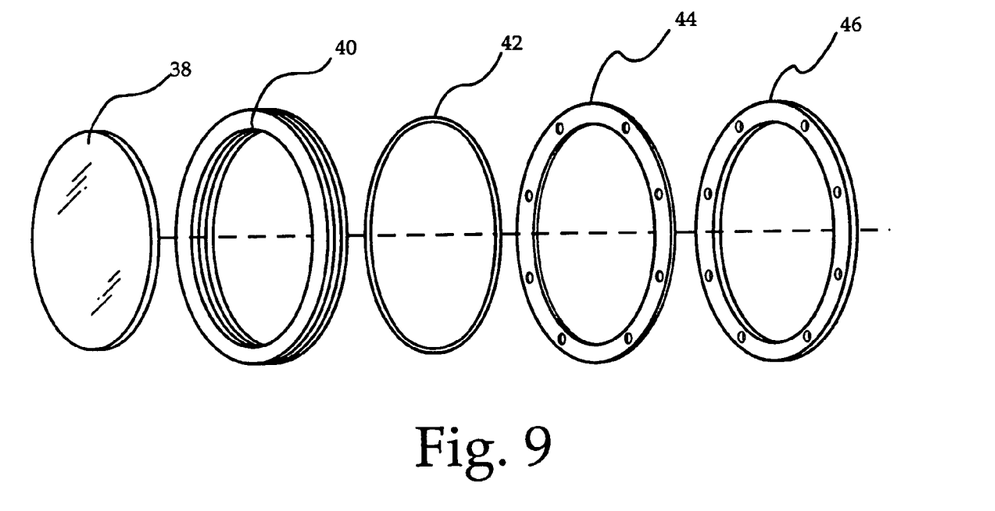
FIG. 9 is an exploded view of the window in the cover.

FIG. 1 is an isometric exploded view of the invention 10 showing the major components. Cover 12 is aerodynamically fairing-shaped. Cover 12 mates to base plate 28. Eleven aircraft grade screws, 14, secure cover 12 to base plate 28 along with O-ring 16 thereby completes sealing invention 10. O-ring 16 is preferentially made from a material that can withstand high temperatures and pressures. O-ring 16 is fitted into circumferential slot 17, thus effectively sealing cover 12 to base plate 28. Optical base plate 28 is designed to be bolted to the outer shell of an aircraft without deformation so that the critical lens assembly is not affected while maintaining a seal pressurized interior which is subjected to +70 C to −54 C temperatures.

An ABS plastic shim 34 simulates the complex spherical top surface 36 of the aircraft so that unit 10 can be mounted in various locations on the aircraft such as behind or below the windscreen or on the bottom of the fuselage. Rubber gasket 30 serves to mount base plate 28 to shim 34.

Existing rivets can be drilled out if located in close proximity to the mount to prevent any new holes from being drilled into the fuselage. If new holes need to be drilled through the aircraft, then a doubler (not shown), well known in the art, will be added inside the aircraft to increase the structural strength of the fuselage's skin. Seven aircraft grade screws 14, secure the invention 10 to the plane.

Note that connection cut-out 32 enables the standard video signal output components 18 to be connected to the cockpit displays as well as permit passage of a cable harness (not shown) for application to a broad range of aircraft/installation configurations as well as control the non-uniformity correction system that is discussed below.

Microbolometer 22 is well known in the art such as made by BAE. Microbolometer 22 features an infinite conjugate lens 26. This device uses the long wavelength infrared spectral band to enhance nighttime and haze visibility.

Non-uniformity flag (NUC) 20 is connected to optical base 28 via a solenoid 24 that permits the pilot to activate the system when required. Flag 20 is a Fresnel lens that is preferably made of light weight plastic. Flag 20 defocuses the scene on the focal plane as is discussed in detail below.

Figure 10:
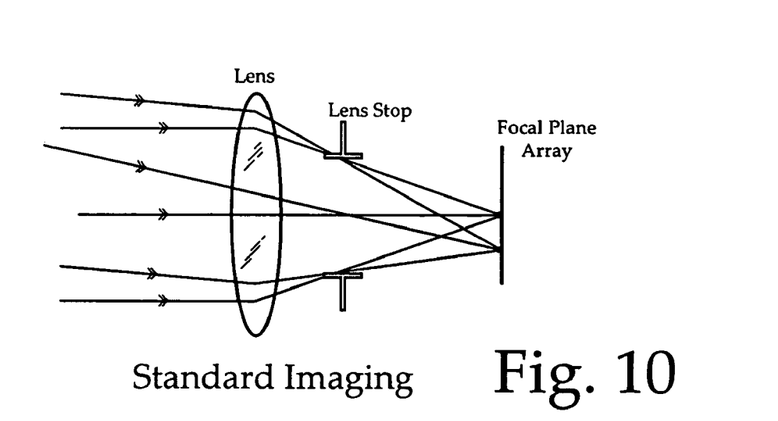
FIG. 10 is an infrared light ray diagram showing standard imaging.

FIG. 10 is an exploded view of the window 30 in cover 12. Window element 38 is permeably a germanium high carbon coated lens. Other materials may be suitable but must be selected to match housing 40 and heater element 44 to provide for a heat conductive path de-misting and de-icing when the aircraft encounters such conditions. Window element 38 is preferably held to housing 40 via thermal adhesive; however, other arrangements are also possible provided the heat conductivity is assured. O-ring 42 seals the housing 40 against heater element 44. Heater retainer 46 completes the assembly.

Figure 11:
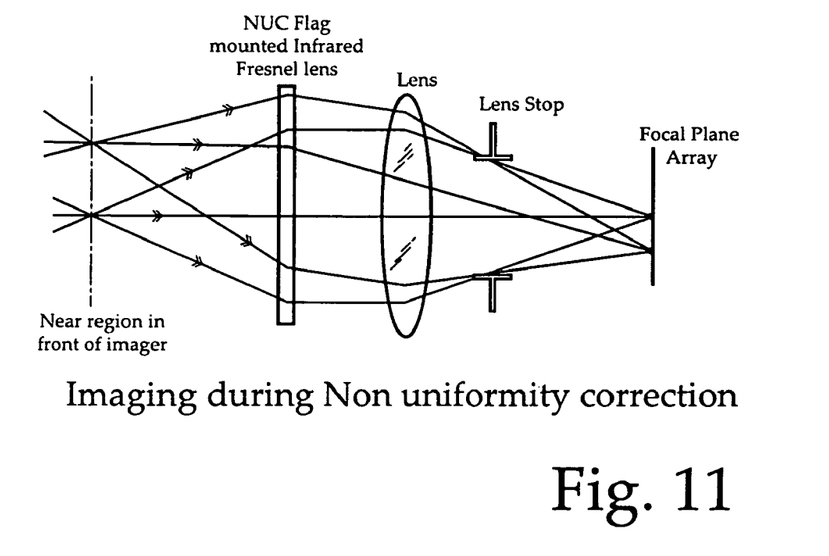
FIG. 11 is an infrared light ray diagram showing imaging during non-uniformity correction.

Referring to FIG. 11 and FIG. 12, the infrared light ray diagram for the invention is shown. The non uniformity correction (NUC) scheme is scene based. This means that it gets the radiant reference energy for correction of the focal plane array response from the imaged scene rather than from an opaque non-uniformity correction flag.

Typically, a NUC flag is mechanically inserted in the imaging path of the lens to present a uniform radiance to the focal plane array (FPA). The NUC flag radiance is either that of the ambient environment within the imager (typical 1-point NUC is also known as 'offset correction') or is thermoelectrically heated and cooled to present 2 temperatures against which a linear correction is determined (2-point NUC or 'gain and offset corrected').

The invention imager requires only a 1-point or offset correction scheme. In general, the radiance of the NUC flag should be similar to the radiance of the scene to be imaged. The residual non-uniformity of response of an imager increases the further away it is from the correction radiances. Consequently, if the NUC flag radiance is not near the radiance of the scene, there will still be residual non-uniformities.

The drawback of a typical opaque NUC flag is that the interior of the camera may be at a significantly different temperature than the scene due to rapid changes in temperature as a function of altitude. When landing an airplane, the camera interior may be much cooler than the landing area and therefore, the NUC flag will have a significantly different radiance.

The NUC flag utilized in the invention features a mounted lens which resolves this issue by presenting the imager with an out-of-focus image of the current scene during non-uniformity correction. In this situation, the NUC radiance scene will have the average radiance of the scene to be imaged. Because the average scene radiance will also, in general, be the radiance that minimizes the difference between the NUC temperature and the scene radiance at each imager pixel, it is the ideal scheme to reduce residual non-uniformity correction errors.

While certain representative embodiments of the invention have been described herein for the purposes of illustration, it will be apparent to those skilled in the art that modification therein may be made without departure from the spirit and scope of the invention.

What is claimed is:

1. An aviation vision apparatus to enhance a pilot's ability to fly an aircraft, said
apparatus comprising:
an uncooled IR sensor having a focal plane array;
an integrated window assembly associated with said sensor, said integrated window assembly including a selectively activated non-uniform correction (NUC) flag providing defocused radiant reference energy for correction of a response from an imaged scene of the focal plane array of the sensor;
wherein said sensor and said integrated window assembly are placed within an integrated fairing enclosure.

2. The apparatus of claim 1 further comprising:
a heater control system for command and control of said IR sensor.

3. The apparatus of claim 2 wherein the focal plane array is based on microbolometers.

4. The vision apparatus of claim 3 wherein said apparatus is mounted to an aircraft using only a mounting plate.

5. The vision apparatus of claim 4 wherein said mounting plate can be boresighted.

6. The aviation vision apparatus of claim 1 wherein said fairing enclosure is aerodynamically shaped.

7. The aviation vision apparatus of claim 1 wherein the non-uniform correction flag comprises an infrared Fresnel lens.

8. The aviation vision apparatus of claim 1 wherein correction of the focal plane array response of the sensor from an imaged scene is not from an opaque-non-uniformity correction flag.

9. The aviation vision apparatus of claim 1 wherein the correction flag presents to the sensor an out-of-focus image of a current scene during non-uniformity correction (NUC).

10. The aviation vision apparatus of claim 9 wherein the NUC radiance scene has the average radiance of the scene to be imaged thereby minimizing differences between the NUC temperature and the NUC scene radiance at each array pixel whereby residual non-uniformity correction errors are reduced.

* * * * *